United States Patent [19]

Bolt et al.

[11] Patent Number: 4,740,574

[45] Date of Patent: Apr. 26, 1988

[54] ALUMINUM NITRIDE STRUCTURES

[75] Inventors: John D. Bolt, Landenberg, Pa.; Fred N. Tebbe, Hockessin, Del.

[73] Assignee: E. I. Du Pont de Nemours and Company, Wilmington, Del.

[21] Appl. No.: 861,603

[22] Filed: May 9, 1986

[51] Int. Cl.$^4$ ............... C04B 35/00; C04B 35/58; C08G 83/00
[52] U.S. Cl. ......................... 528/9; 501/96; 501/99; 528/481; 264/29.2
[58] Field of Search ............ 528/9, 481; 501/96, 501/99; 264/29.2

[56] References Cited

U.S. PATENT DOCUMENTS

| | | | |
|---|---|---|---|
| 3,136,667 | 6/1964 | D'Alelio | 528/9 |
| 4,022,809 | 5/1977 | Granella et al. | 528/9 |
| 4,032,553 | 6/1977 | Dozzi et al. | 528/9 |
| 4,128,567 | 12/1978 | Corbellini et al. | 528/9 |
| 4,256,792 | 3/1981 | Koepke et al. | 428/119 |
| 4,435,513 | 3/1984 | Komeya et al. | 501/96 |
| 4,615,863 | 10/1986 | Inoue et al. | 501/96 |

*Primary Examiner*—Allan M. Lieberman

[57] ABSTRACT

Aluminum nitride structures are made by pyrolyzing the condensation products of certain organo-aluminum compounds with certain aromatic diamines, triamines or tetraamines.

8 Claims, No Drawings

ALUMINUM NITRIDE STRUCTURES

BACKGROUND OF THE INVENTION

The use of aluminum nitride fiber to impart anisotropic thermal properties to composite electronic substrates is described in U.S. Pat. No. 4,256,792. The present invention provides another fiber that functions in a similar manner and which is prepared by a novel process.

Condensation products of alkyl aluminum and aliphatic amines, hydrazines or aniline, are known in the art. One disadvantage of such products is that they are liquids or melt on heating to temperatures required for processing for end-use applications. One object of the present invention is to provide a new material which overcomes this deficiency.

SUMMARY OF THE INVENTION

This invention provides a condensation polymer from an organo-aluminum compound and more particularly from $$R_n-Al-X_m$$

where R is aliphatic or aromatic hydrocarbon, X is hydrogen or halogen, and n plus m must equal 3 with the proviso that when X is hydrogen, m is 0 to 3, and when X is halogen, m is 0 to 2, and an aromatic diamine, triamine or tetraamine in the molar proportions of 8:1 to 1:1. Shaped articles of this product such as fibers, as well as articles resulting from pyrolysis of these shaped articles are also contemplated herein.

DETAILED DESCRIPTION OF THE INVENTION

Products of the present invention are made from organo-aluminum compounds and aromatic diamines, triamines or tetraamines in the molar proportion of 8:1 to 1:1 in an organic solvent. The organo-aluminum compound conforms to the formula $$R_n-Al-X_m$$

where R represents an aliphatic (including cycloaliphatic) hydrocarbon group, preferably lower alkyl, i.e., 1 to 6 carbon atom alkyl, or an aromatic hydrocarbon group such as phenyl or p-tolyl. X is hydrogen or halogen such as chlorine, bromine or iodine. When X is hydrogen, m is 0 to 3 and when X is halogen m is 0 to 2. In either case, n plus m equals 3. Thus, the compound may be trihydrocarbyl, i.e., n is 3 and m is zero, or one or two of the hydrocarbon groups may be replaced by halogen, preferably chlorine atoms. When X is hydrogen, zero, one or two hydrocarbon groups may be present. Illustrative of such compounds are aluminum hydride ($AlH_3$), triethylaluminum, trimethylaluminum, diethylaluminum chloride, diethylaluminum hydride, etc. The trialkyl aluminums are the preferred compounds for the purpose.

The aromatic amines may be difunctional such as 1,5-diaminonaphthalene, bis(4-aminophenyl)methane, 4,4'-diaminodiphenyl ether, 1,2-dianilinoethane, N,N'-dimethyl-p-phenylene diamine, p-phenylene diamine and m-phenylene diamine, or trifunctional such as melamine, or tetrafunctional such as tetraaminobenzene or diaminobenzidine. The polyfunctional aromatic amines may also be employed in the form of their hydrochlorides, e.g., the dihydrochlorides or trihydrochlorides. Aliphatic diamines are unsuitable giving polymers with triethylaluminum, for example, which are low melting and unsuitable for pyrolysis with retention of shape.

The preferred proportions of organo-aluminum compound to aromatic amine is 2:1 for the diamine, 3:1 for the triamine and 4:1 for the tetraamine.

The solvent medium for the polymerization reaction can be any organic solvent inert to the reactants under the polymerization conditions. Among these are aliphatic and aromatic hydrocarbons such as hexane and toluene, ethers and halogenated hydrocarbons such as chloroform, and methylene chloride.

Polymerization is carried out in general by dissolving the $R_n-Al-X_m$ compound in the solvent and adding the aromatic amine with stirring. Gas is evolved and the solvent is removed by evaporation under vacuum. The polymer, after shaping as desired, is then pyrolyzed under vacuum, ammonia or an inert gas, such as nitrogen or argon. The product substantially retains its shape and is comprised of aluminum nitride and carbon. Aluminum and nitrogen are found in almost stoichiometric amounts confirming the presence of aluminum nitride in X-ray powder patterns. Small amounts of hydrogen are found in the pyrolysis product. Excess nitrogen is present when melamine is employed as a reactant, or if the pyrolysis atmosphere is nitrogen or ammonia. Chlorine is also present in the pyrolysis product when amine hydrochlorides or hydrocarbyl aluminum chlorides are used.

The following examples are illustrative of the invention and are not intended as limiting. All polymerizations were performed in a nitrogen filled glove-box at room temperature unless otherwise indicated. Pyrolysis was conducted by placing a pyrolysis tube containing the initial condensation product into a pyrolysis oven and raising the temperature from room temperature to the indicated maximum temperature over a period of about one hour.

EXAMPLE 1

Three ml (22 mmole) of triethylaluminum ($AlEt_3$) was dissolved in 25 ml of methylene chloride in a round bottom flask. 2.4 g (22 mmole) of p-phenylenediamine (PPD) was added with stirring over about ten minutes. Gas, presumably ethane, evolved. The methylene chloride was removed by evaporation under reduced pressure yielding a viscous tacky product. Final traces of the solvent were removed under vacuum overnight leaving a solid polymer. 3.8 g of the polymer were recovered from the flask. 0.56 g of the polymer was placed in a Vycor pyrolysis tube with a closed stopcock attached, removed from the dry box, and pyrolyzed under vacuum by raising the temperature to 980° C. over approximately 90 minutes. The polymer retained its shape, shrinking somewhat, but with no evidence of melting. 0.338 g was recovered (60% pyrolysis yield). Further pyrolysis in argon to 1515° C. showed less than 10% additional weight loss. The 1515° C. pyrolysis product gave an X-ray powder pattern with broad peaks corresponding to aluminum nitride at d-spacings of 2.69, 2.50, 2.38, and 1.55 Angstroms. Elemental analysis of this product gave 59.76% C, 0.32% H, 11.6% N, and 23.8% Al. Concentration by evaporation in a shallow pan of the original polymerization solution gave a tacky solution from which very long fibers could be pulled using a spatula and drawing them out rapidly. As observed for the bulk polymer these fibers retained their shape when pyrolyzed.

EXAMPLE 2

3.0 ml (22 mmole) of AlEt₃ was dissolved in 40 ml of toluene and 1.2 g (11 mmole) of PPD was added with stirring. Gas evolved and the reaction was shown to evolve heat as observed by the warming of the solution. Some gelation was observed but with continued stirring for 45 min. the solution was homogeneous and the gel had dissolved. Evaporation under vacuum overnight left a clear solid polymer with a slightly pink color weighing 3.1 g. Elemental analysis of this product gave 60.99% C, 9.45% H, 10.09% N and 19.16% Al. The weight yield and elemental analysis suggest that one mole of ethane is lost per mole of AlEt₃. Calculated for loss of one ethane: 60.85% C, 9.48% H, 10.14% N, and 19.53% Al. Pyrolysis of this polymer at 900° C. in vacuum gave a 61% yield of product which analyzed: 54.91% C, 0.40% H, 15.0% N, and 30.1% Al. Pyrolysis in nitrogen to 900° C. gave 59% yield and 53.45% C, 0.7% H, 16.7% N, and 29.4% Al.

EXAMPLE 3

To a solution of 5.0 ml of AlEt₃ (37 mmole) in 100 ml of methylene chloride was added 3.3 g of m-phenylene diamine dihydrochloride (18 mmole) over a period of 15 minutes. Gas evolved. (When a small amount of the solution was concentrated by evaporation a tacky solution resulted from which short fibers could be pulled.) The solution was stirred for an hour, then evaporated. A powdery solid remained weighing 4.98 g. Analysis of the polymer gave: 40.83% C, 5.86% H, 8.98% N, 17.76% Al, and 23.37% Cl. Pyrolysis of the polymer in vacuum to 900° C. gave a product which analyzed 37.83% C, 0.99% H, 14.35% N, 24.65% Al, and 19.55% Cl.

EXAMPLE 4

To a solution of 2.0 ml (15 mmole) of AlEt₃ in 15 ml of methylene chloride was added 0.63 g (5 mmole) of melamine. Gas evolution continued for 15 minutes. A slight amount of precipitate was removed by filtration and the solvent was removed by rotary evaporation under vacuum. A glassy solid remained. This polymer was pyrolyzed in vacuum to 900° C. (56% yield) and then to 1420° C. in argon. The final pyrolysis product gave an X-ray powder pattern showing broad peaks indicative of aluminum nitride. The polymerization was scaled-up and the product was pyrolyzed in vacuum and, separately, in ammonia. The pyrolysis product in vacuum (950° C., 60% yield) analyzed as follows: 37.84% C, 0.34% H, 25.75% N, 35.65% Al. The pyrolysis product in ammonia (900° C., 36% yield) analyzed: 7.38% C, 0.40% H, 34.8% N, 50.7% Al.

EXAMPLES 5–10

Further examples of polymerizations and pyrolyses are summarized in the following table:

| POLYMERIZATION Amine/Alkylaluminum/solvent[a] (analysis of polymer, wt. %) | PYROLYSIS Atmosphere/final temperature/yield (analysis of ceramic product, wt. %) |
| --- | --- |
| 5. PPD/2AlEt₃/CH₂Cl₂ (C-60.16, H-8.84, N-9.67 Al-19.31) | a. Vacuum to 200° C. then NH₃ to 900° C., 33% (C-17.26, H-1.30, N-33.75 Al-44.70) |
|  | b. NH₃ to 900° C., 23%[b] (C-1.64, H-0.94, N-26.10, Al-54.65) |
| 6. PPD/2AlEt₃/hexane (C-57.61, H.69, N-9.28, Al-18.13) | Vacuum to 950° C., 59% (C-54.34, H-0.47, N-15.45, Al-29.20) |
| 7. PPD/2AlEt₃/toluene (see example 2) | a. NH₃ to 900° C., 36% (C-9.91, H-1.01, N-27.8, Al-47.00) |
|  | b. N₂ to 900° C., 59% (C-53.50, H-0.70, N-16.70 Al-29.40) |
| 8. PPD 2HCl/2AlEt₃/CH₂Cl₂(C-41.38, H-6.17, N-8.18, Al-17.86, Cl-23.18 | Vacuum to 900° C., 47% (C-42.77, H-0.47, N-15.87 Al-27.50, Cl-13.50) |
| 9. PPD/2AlEt₂Cl[c]/CH₂Cl₂ (C-36.88, H-6.57, N-8.97, Al-15.65, Cl-20.67) | Vacuum to 900° C., 30% (C-40.37, H-0.24, N-16.10 Al-27.10, Cl-10.40) |
| 10. PPD.2HCl/2AlEt₂Cl/CH₂Cl₂(C-34.54, H-5.10, N-9.51, Al-11.03, Cl-39.42) | — |

[a]ratio of alkylaluminum compound to polyfunctional amine is 2:1 in all cases.
[b]Apparently depolymerizes
[c]diethylaluminum chloride

We claim:
1. An condensation polymer from an organo-aluminum compound and an aromatic diamine, triamine, tetraamine or a hydrochloride of such aromatic amines in the molar proportion of 8:1 to 1:1 such organo-aluminum compound being of the formula

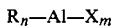

where R is aliphatic or aromatic hydrocarbon, X is hydrogen or halogen, and n plus m must equal 3 with the proviso that when X is hydrogen, m is 0 to 3, and when X is halogen, m is 0 to 2.

2. The product of claim 1 wherein the organo-aluminum compound is triethylaluminum.
3. A shaped article of the product of claim 1.
4. A filament of the product of claim 1.
5. A pyrolysis product of claim 1 comprising aluminum nitride and carbon.
6. A process for preparing the product of claim 1 comprising reacting an organo-aluminum compound of the formula

where R is aliphatic or aromatic hydrocarbon, X is hydrogen or halogen, and n plus m must equal 3 with the proviso that when X is hydrogen, m is 0 to 3, and when X is halogen, m is 0 to 2, with an aromatic diamine, triamine, tetraamnine or a hydrochloride of such aromatic amines in the molar proportions of 8:1 to 1:1 in the presence of an organic solvent inert to the reactants under the polymerization conditions.

7. The process of claim 7 wherein the organo-aluminum compound is triethylaluminum.
8. A process comprising pyrolyzing the product of claim 1.

* * * * *